(12) United States Patent
Nöbauer et al.

(10) Patent No.: US 6,310,314 B2
(45) Date of Patent: Oct. 30, 2001

(54) PROCEDURE FOR FASTENING A CARBIDE TOOTH AT A SAW BLADE

(75) Inventors: Franz Nöbauer, Mehrnbach; Gerhard Liedl, Vienna, both of (AT)

(73) Assignee: Wintersteiger GmbH, Ried (AT)

( * ) Notice: Subject to any disclaimer, the term of this patent is extended or adjusted under 35 U.S.C. 154(b) by 0 days.

(21) Appl. No.: 09/745,680

(22) Filed: Dec. 22, 2000

(30) Foreign Application Priority Data

Dec. 27, 1999 (AT) ................................. A 2185/99

(51) Int. Cl.⁷ ..................................... B23K 26/20
(52) U.S. Cl. ................... 219/121.61; 219/121.64; 228/231; 228/232
(58) Field of Search .................. 219/121.61, 121.63, 219/121.64, 121.85; 228/231, 232, 234.1

(56) References Cited

U.S. PATENT DOCUMENTS 4,337,750 * 7/1982 Dutcher .................................. 125/15
4,488,882 * 12/1984 Dausinger et al. ..................... 51/295

FOREIGN PATENT DOCUMENTS

| 34 34 714 | 4/1986 | (DE) . |
| 195 01 442 | 7/1996 | (DE) . |
| 09201720 | 1/1996 | (JP) . |

* cited by examiner

Primary Examiner—Samuel M. Heinrich
(74) Attorney, Agent, or Firm—Collard & Roe, P.C.

(57) ABSTRACT

The description relates to a procedure for fastening a carbide tooth (1) at a saw blade (2), with a carbide tooth (1) fabricated according to the saw tooth geometry being held butt-jointed to the prepared front-side abutting surface (3) of the saw blade (2) and then being attached to the saw blade under addition of heat along the joint (10) between the saw blade (2) and the carbide tooth (1). To create favorable process conditions it is suggested that the carbide tooth (1) is welded to the saw blade (2) by means a focal spot (9) of a laser beam (7) extending over the whole joint length.

3 Claims, 1 Drawing Sheet

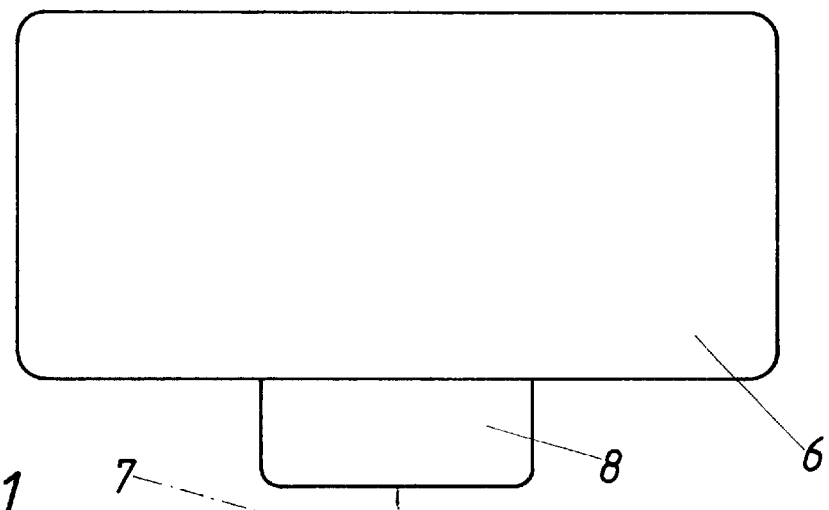
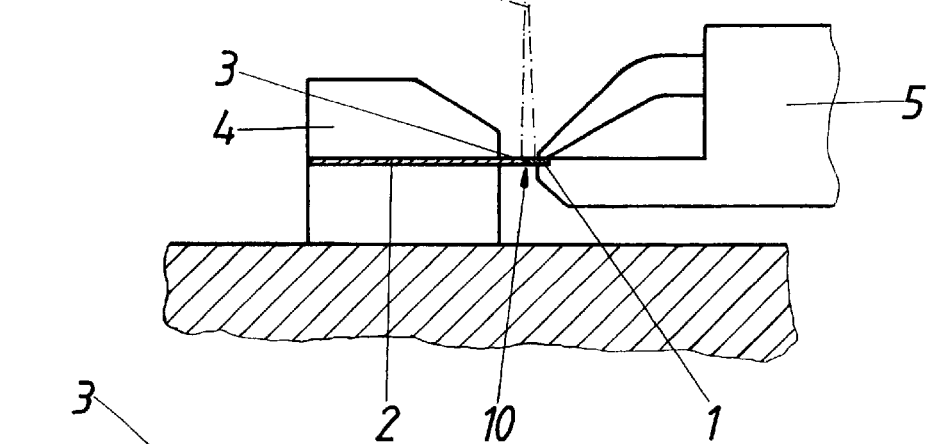
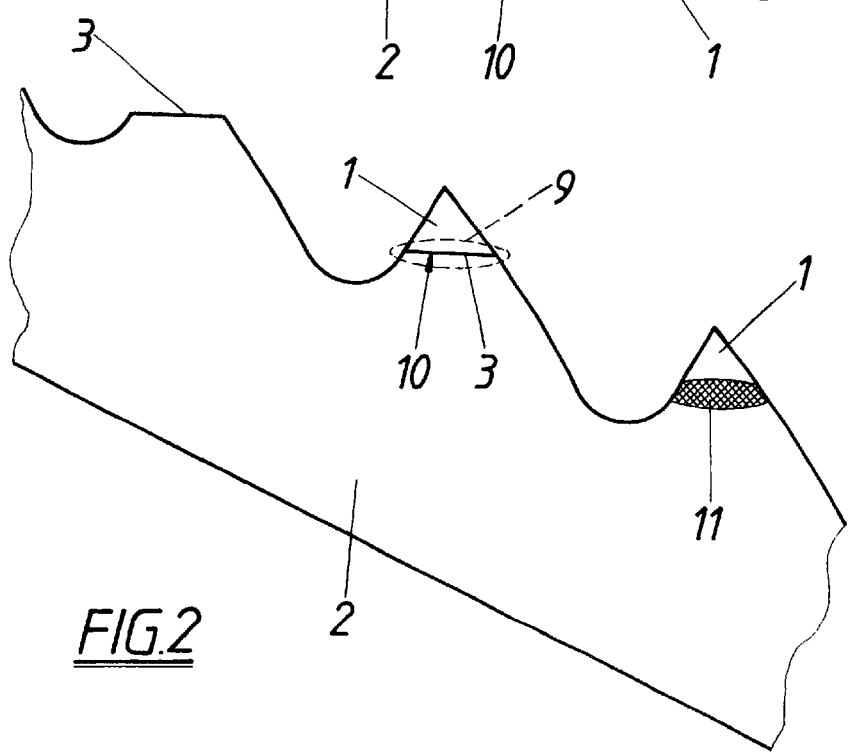

PROCEDURE FOR FASTENING A CARBIDE TOOTH AT A SAW BLADE

FIELD OF THE INVENTION

The invention relates to a procedure for fastening a carbide tooth at a saw blade, with the carbide tooth fabricated according to the saw tooth geometry being held butt-jointed to the prepared front-side abutting surface of the saw blade and then being attached to the saw blade under addition of heat along the joint between the saw blade and the carbide tooth.

1. Description of the Prior Art

To be able, for instance, when cutting wooden lamellas, to keep the wood losses due to machining as small as possible and thus to better exploit the wooden material, cutting gaps as thin as possible are desired, which demands accordingly thin saw blades. However, with such thin saw blades the advantages of resharpenable carbide teeth cannot be utilized, as by fastening carbide teeth at the saw blade via hard-soldering as usual the required strength for cutting in an inhomogeneous wooden material without teeth breaking off cannot be achieved. Although it is known to fix spherical or cylinder-shaped carbide blanks to the tooth tips of saw blades by means of resistance welding, these carbide blanks in fact require complicated finishing by grinding to obtain the desired tooth geometry. As the carbide blanks have to be pressed tightly against the abutting surfaces of the saw blades during resistance welding, an exact positioning of the carbide blanks relative to the saw tooth is impossible due to material melting open in the joint area, which, on the one hand, demands spherical or cylinder-shaped carbide blanks, and, on the other hand, excludes the use of carbide teeth that have already been fabricated according the later tooth geometry before being welded on. To be able to keep the grinding work for finishing the welded-on carbide blanks comparatively low, only the tips of the teeth are made of carbide, so that resharpening such saws with welded-on saw tooth tips made of carbide is hardly possible.

SUMMARY OF THE INVENTION

The invention has therefore the objective to provide a procedure for fastening a carbide tooth at a saw blade in the above mentioned kind, to establish a sufficiently fast connection between the saw blade and the carbide tooth, that is with the carbide tooth being position ed sufficiently accurate to permit the use of carbide teeth fabricated according to the saw tooth geometry, thus making complicated finishing unnecessary.

The objective of the invention is achieved in that the carbide tooth is welded to the saw blade by means of a focal spot of a laser beam extending over the whole joint length.

By the application of a sufficiently powerful laser beam the carbide tooth need not be pressed against the related abutting surface of the saw blade during welding, so that the carbide tooth can be fabricated according to the saw to both geometry before welding and can be exactly attached to the saw blade in a defined position. The welding process is performed simply, as, due to the specific shape of the focal spot of the laser beam, the carbide tooth is welded to the saw blade at the same over the whole joint length, which leads to a largely regular heat load of the carbide tooth and the saw blade with the effect that a sufficiently fast connection between the carbide tooth and the saw blade at a very low risk of fissures is established, that is at a comparatively low welding expenditure, as the laser beam does not require any displacement toward the joint between the carbide tooth and the saw blade. Thus, conditions are achieved that can be compared to those of spot welding, with the welding area, however, not being restricted locally to a section of the joint, but extending over the whole joint length. The desired shape of the focal spot, which is essentially lenticular, can, at a given cross section of the laser beam, be ensured without difficulties via an appropriate optical system.

As the whole welding area for a carbide tooth is covered by the accordingly shaped focal spot of the laser beam, the saw blade and the carbide tooth, in another embodiment of the invention, can be preheated prior to welding in the area of the joint by means of the laser beam proper at a reduced output, so that the risk of fissures is further reduced.

To reduce thermal stress, it is common practice for welding to subject the weld joint to a secondary thermal treatment. For this purpose the welding area between the saw blade and the carbide to both may be reannealed after welding by means of the laser beam, too, at reduced output, so that, for completion of the saw, the welded-on carbide teeth need only be resharpened by grinding.

BRIEF DESCRIPTION OF THE DRAWING

By the example of the drawing the procedure according to the invention for fastening a carbide tooth at a saw b lade is illustrated in detail.

FIG. 1 shows a facility to accomplish the procedure in a schematic side view, and FIG. 2 depicts a saw with partly welded-on carbide teeth in a schematic horizontal projection.

DESCRIPTION OF THE PREFERRED EMBODIMENT

The saw blade 2 to be equipped with carbide teeth 1, which saw blade 2 may be either a single blade, an endless blade or a disk, depending on whether a mill saw blade, an endless saw blade or a circular saw blade shall be fabricated, is provided with prepared abutting surfaces 3 for welding on of the carbide teeth 1 that already show the tooth geometry required later. To be able to exactly align the individual carbide teeth 1 relative to the abutting surfaces 3 of the saw blade 2 for the welding procedure, the saw blade 2 is clamped, according to FIG. 1, into a holding device 4 in such a way that the abutting surface 3, to which the relevant carbide tooth 1 shall be welded on, is situated opposite to positioning tongs 5, by means of which the relevant carbide tooth 1 is set butt-jointed to the front-side abutting surface 3 of the saw blade 2 and is held ready for welding. The carbide tooth 1 thus aligned relative to the saw blade 2 and/or the abutting surface 3 is then welded to the abutting surface 3 of the saw blade 2 by means of a laser welding device 6. For this purpose the laser beam 7 is focused via an optical system 8 in such a way that a focal spot 9 is generated, as it is outlined in dashes in FIG. 2. This essentially lenticular focal spot 9 extends over the whole length of the joint 10 established between a carbide tooth 1 and the abutting surface 3, so that, under conditions comparable to spot welding, the welded joint is created at the same time over the whole joint length. As the heat load is consequently largely regular over the joint length, the risk of fissures due to thermal stress is reduced and a way of fastening of the carbide teeth at the saw blade 2 is ensured that meets all requirements, even if the saw blade 2 is very thin to keep cutting gaps small. The welding area resulting from the selected shape of the focal spot between the carbide teeth 1 and the saw blade 2 is schematically indicated in FIG. 2 by cross hatches 11.

The focal spot 9 extending over the whole welding area 11 provides the favorable possibility to apply an additional heat treatment at reduced output via the laser beam 7. Thus it is possible, via the laser beam 7, to preheat the later welding area 11 to further reduce the risk of fissures due to thermal stress. Moreover, the welding area 11 can be reannealed after welding to reduce existing thermal stress. Therefore, only the output of the laser welding device 6 needs to be controlled accordingly to preheat the later welding area 11 prior to welding and then to perform welding at full laser output, before a secondary thermal treatment is applied, again at reduced output.

What is claimed is:

1. Procedure for fastening a carbide tooth (1) at a saw blade (2), with the carbide tooth (1) fabricated according to the saw tooth geometry being held butt-jointed to the prepared front-side abutting surface (3) of the saw blade (2) and then being attached to the saw blade under addition of heat along the joint (10) between the saw blade (2) and the carbide tooth (1), characterised in that the carbide tooth is welded to the saw blade by means of a focal spot of a laser beam extending over the whole joint length.

2. Procedure according to claim 1, characterised in that the saw blade and the carbide tooth are preheated prior to welding in the area of the joint by means of the laser beam at reduced output.

3. Procedure according to claim 1, characterised in that the welding area is reannealed after welding by means of the laser beam at reduced output.

* * * * *